(12) United States Patent
Abdulnasyrov et al.

(10) Patent No.: US 9,208,144 B1
(45) Date of Patent: Dec. 8, 2015

(54) CROWD-SOURCED AUTOMATED VOCABULARY LEARNING SYSTEM

(71) Applicant: LinguaLeo Inc., Tortola (VG)

(72) Inventors: Aynur Abdulnasyrov, Moscow (RU); Alexey Odin, Moscow (RU); Taras Zagibalov, Moscow (RU)

(73) Assignee: LinguaLeo Inc., Tortola (VG)

( * ) Notice: Subject to any disclaimer, the term of this patent is extended or adjusted under 35 U.S.C. 154(b) by 258 days.

(21) Appl. No.: 13/938,989

(22) Filed: Jul. 10, 2013

Related U.S. Application Data

(60) Provisional application No. 61/670,853, filed on Jul. 12, 2012.

(51) Int. Cl.
*G06F 17/28* (2006.01)
*G06F 17/27* (2006.01)

(52) U.S. Cl.
CPC ........ *G06F 17/2735* (2013.01); *G06F 17/2809* (2013.01); *G06F 17/289* (2013.01)

(58) Field of Classification Search
CPC .............. G06F 17/2836; G06F 17/289; G06F 17/2735; G06F 17/2809; G06F 17/2827; G06F 17/2854
See application file for complete search history.

(56) References Cited

U.S. PATENT DOCUMENTS

| | | |
|---|---|---|
| 6,192,332 B1 * | 2/2001 | Golding ........................... 704/2 |
| 2004/0205671 A1 * | 10/2004 | Sukehiro et al. ............... 715/532 |
| 2007/0203688 A1 * | 8/2007 | Fuji et al. ........................... 704/2 |
| 2008/0162114 A1 * | 7/2008 | Torres-Rocca et al. .......... 704/7 |
| 2008/0243472 A1 * | 10/2008 | DeGroot et al. ................. 704/2 |
| 2012/0010870 A1 * | 1/2012 | Selegey et al. ................... 704/3 |
| 2012/0209588 A1 * | 8/2012 | Wu ................................... 704/3 |
| 2012/0330643 A1 * | 12/2012 | Frei et al. ......................... 704/2 |

* cited by examiner

*Primary Examiner* — Samuel G Neway
(74) *Attorney, Agent, or Firm* — Bardmesser Law Group

(57) ABSTRACT

A method and system for providing users with an individual learning dictionary having exact context-based translation of words and phrases. Each user is provided with a personal dictionary containing words and phrases that the user had encountered and translated previously. The phrases and words are automatically added to the user personal dictionary along with their context-based translations chosen by the user. A contextual dictionary allows a user to choose a correct meaning of a word and save it along with the context for future reference.

14 Claims, 12 Drawing Sheets

Let's talk about manias. Let's start with Beatle mania. Hysterical teenagers, crying, screaming, pandemonium. Sports mania. Deafening crowds. All for one idea. Get the ball in the net. Okay, religious mania. There's rapture. There's weeping. There's visions. Manias can be good. Manias can be alarming. Or manias can be deadly.

The world has a new mania. A mania for learning English. Listen as Chinese students practice their English by screaming it.

Teacher: ... change my life!

Students: I will менять my life.

T: I don't want to let my parents down.

S: I don't want to let my parents down.

FIG. 9

CROWD-SOURCED AUTOMATED VOCABULARY LEARNING SYSTEM

CROSS-REFERENCE TO RELATED APPLICATIONS

This application claims priority to Provisional U.S. Patent Application No. 61/670,853, filed on Jul. 12, 2012, incorporated by reference herein in its entirety.

BACKGROUND OF THE INVENTION

1. Field of the Invention

This invention relates to a method and system for an automated context-based self-teaching dictionary and to translator for use in language learning systems.

2. Description of the Related Art

A number of different web-based dictionaries and vocabulary learning systems are available to users. Typically, a user can enter a word or a phrase in one language and get it instantly translated into a desired language by simple click of a button. Such systems may be used for language learning, but they need to be compiled before use and may not correspond to an individual's needs and interests of a user. Creation of such systems and adopting them to individual needs and interests can be a long, difficult and costly process. Accordingly, a method and system for correct automated creation of individual vocabulary learning dictionaries that uses collected (crowd-sourced) context-based statistics is desired.

SUMMARY OF THE INVENTION

Accordingly, the present invention is related to a method and system for an automated creation of word-lists (dictionaries, vocabularies) used for language learning based on collected statistics of previous context-based translations that substantially obviates one or more of the disadvantages of the related art.

The present invention is directed to a system, method and computer program product for providing users with personalized individual word-lists (learning dictionaries, vocabularies) with exact context-based translation of words and phrases encountered by the user. Each user is provided with a personal dictionary containing words and phrases that the user had encountered and translated previously. The phrases and words are automatically added to the user personal dictionary along with their context-based translations chosen by the user. A contextual dictionary allows a user to choose a correct meaning of a word and save it along with the word context for future reference.

According to an exemplary embodiment, after a large number of users had created their personal dictionaries, a frequency of different translations of the same word (or phrase) is determined. When a user works with a text, the text undergoes linguistic processing that determines a frequency of occurrence of each word in the text. This statistic is collected on a server. A large statistics database is accumulated over time. The database reflects statistical distribution (n-gram, second order neighborhood) of variations of words (or phrases) in the texts.

The contextual dictionary allows a user to add their audio, video and graphical content and other meta-data (geo-location, time, etc) to illustrate the meaning of the word. This increases the relevance of the new word to the user's own experience and helps remember it better. Adding audio-visual illustrations also helps people to memorize words using audio and visual associations (some people remember audio content better, others make better use of visual content).

Subsequently, a user private dictionary is created based on the statistics. This dictionary allows a user to see all possible variations of translation of a given word based on a particular context.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 7:
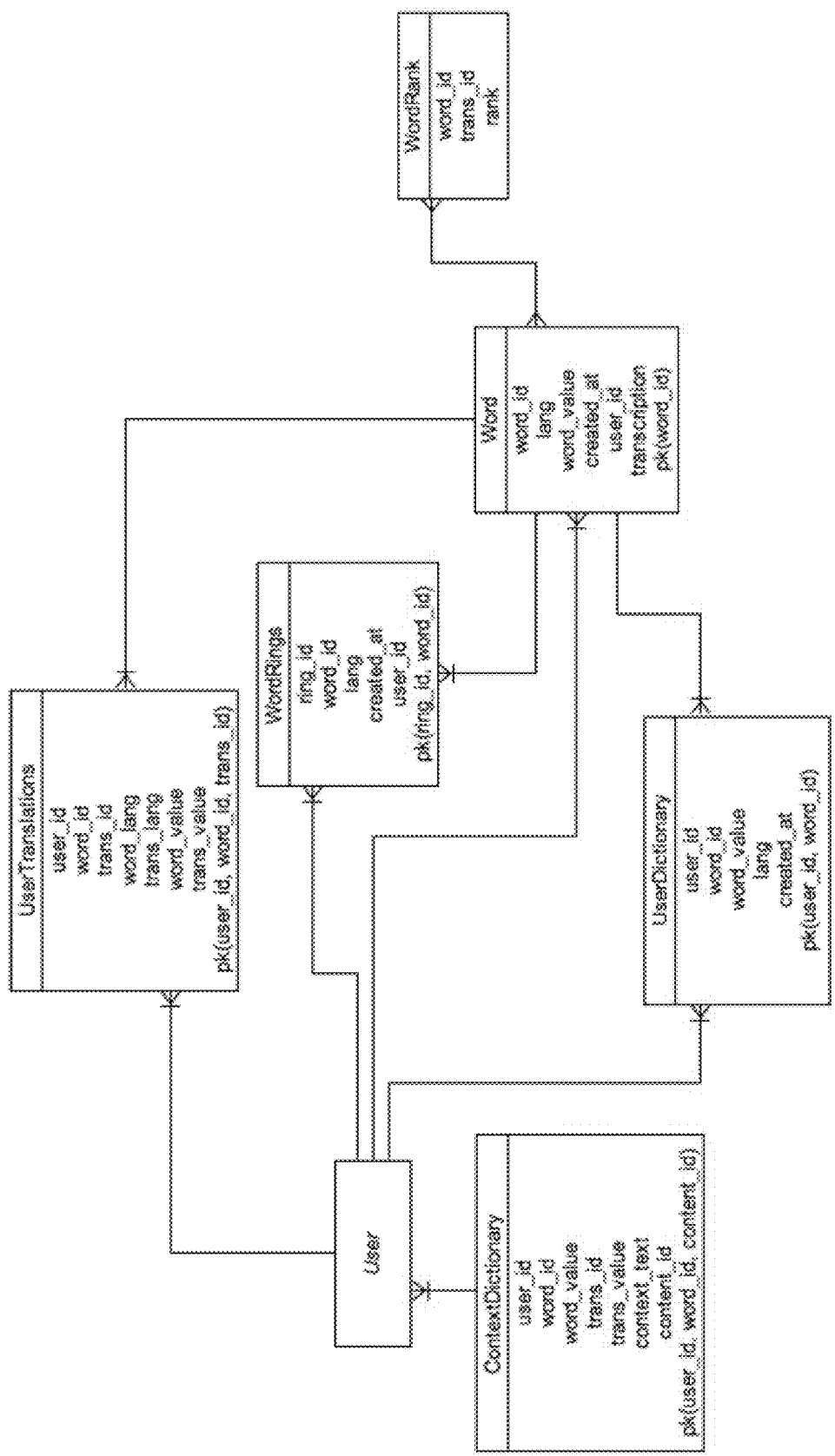

FIG. 7 describes a data structure and work-flow between separate elements of the exemplary implementation of the system.

Figure 5:
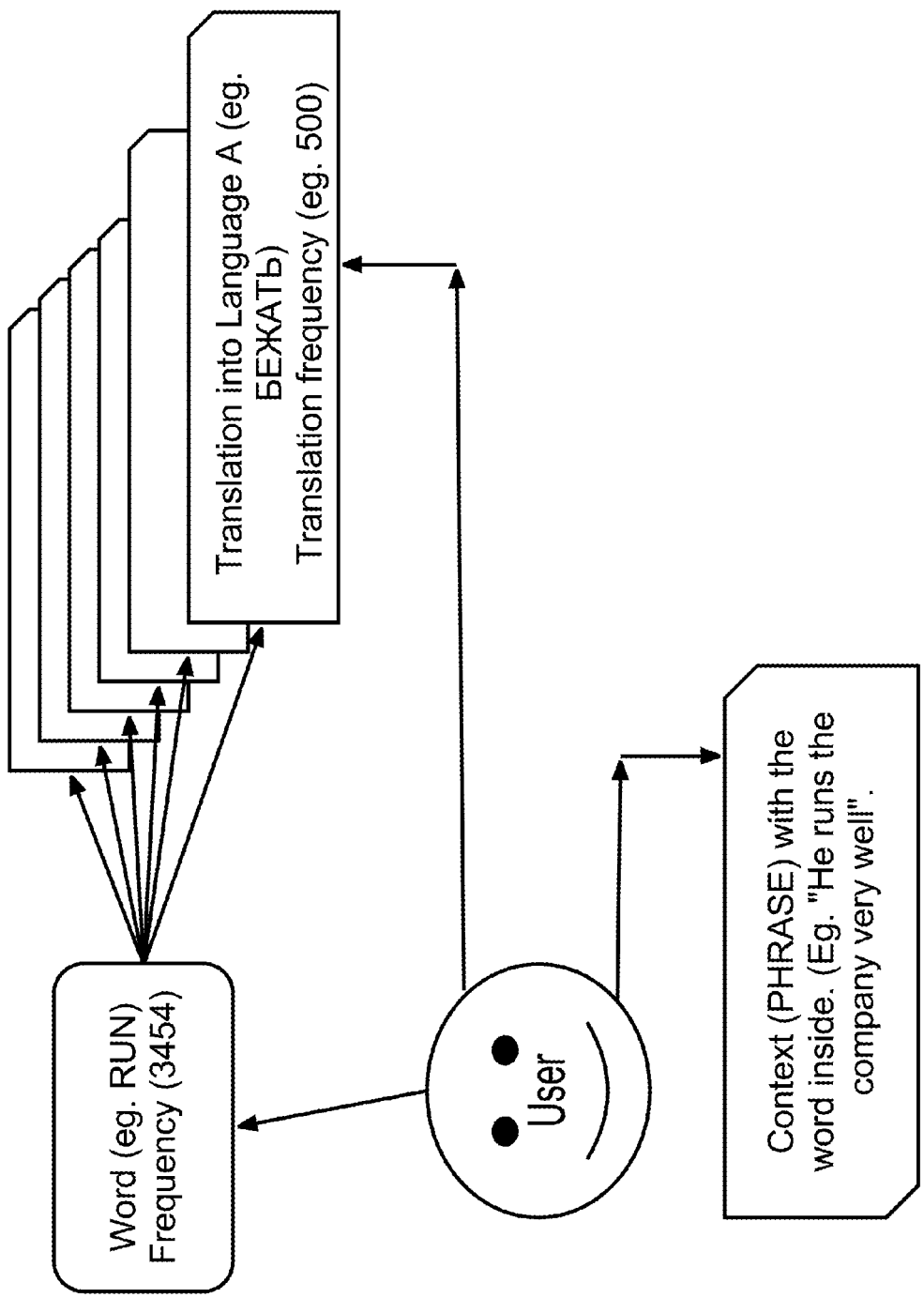
FIG. 5 illustrates an example of using the translation frequency.
Figure 8:
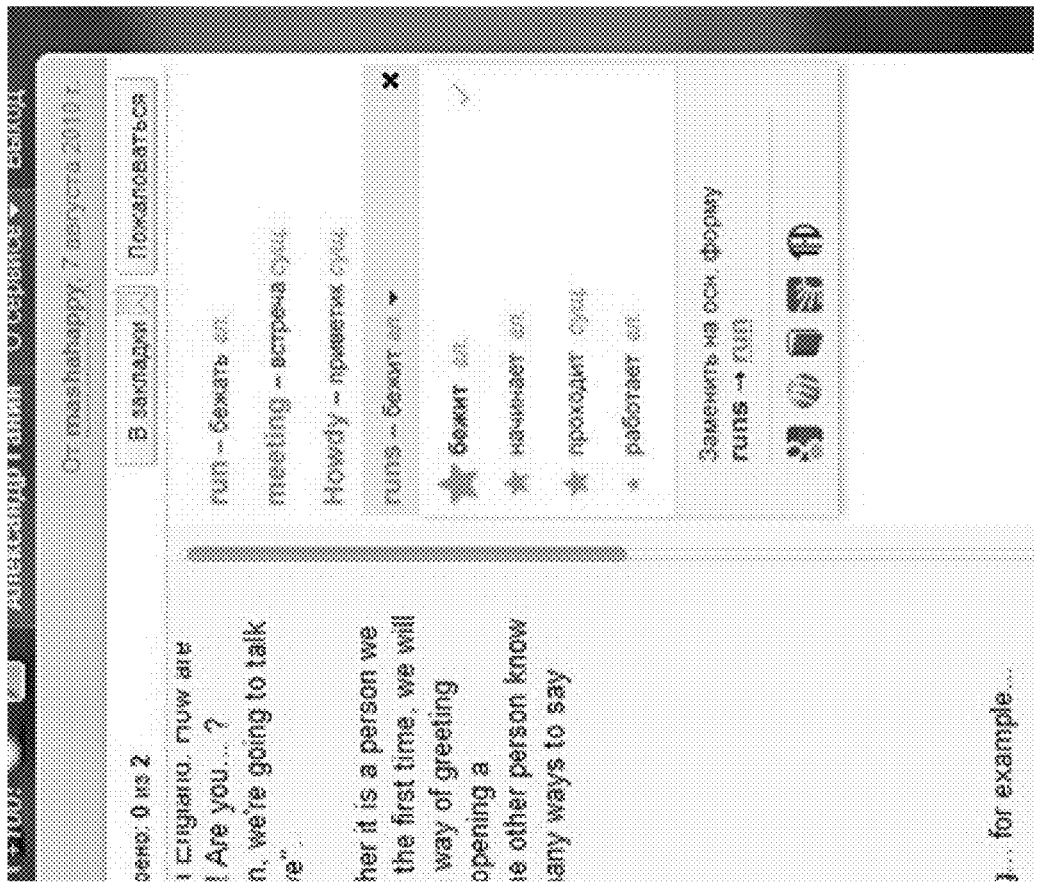

FIG. 8 is a screenshot illustrating an example depicted in FIG. 5 using the word "run."

Figure 10:
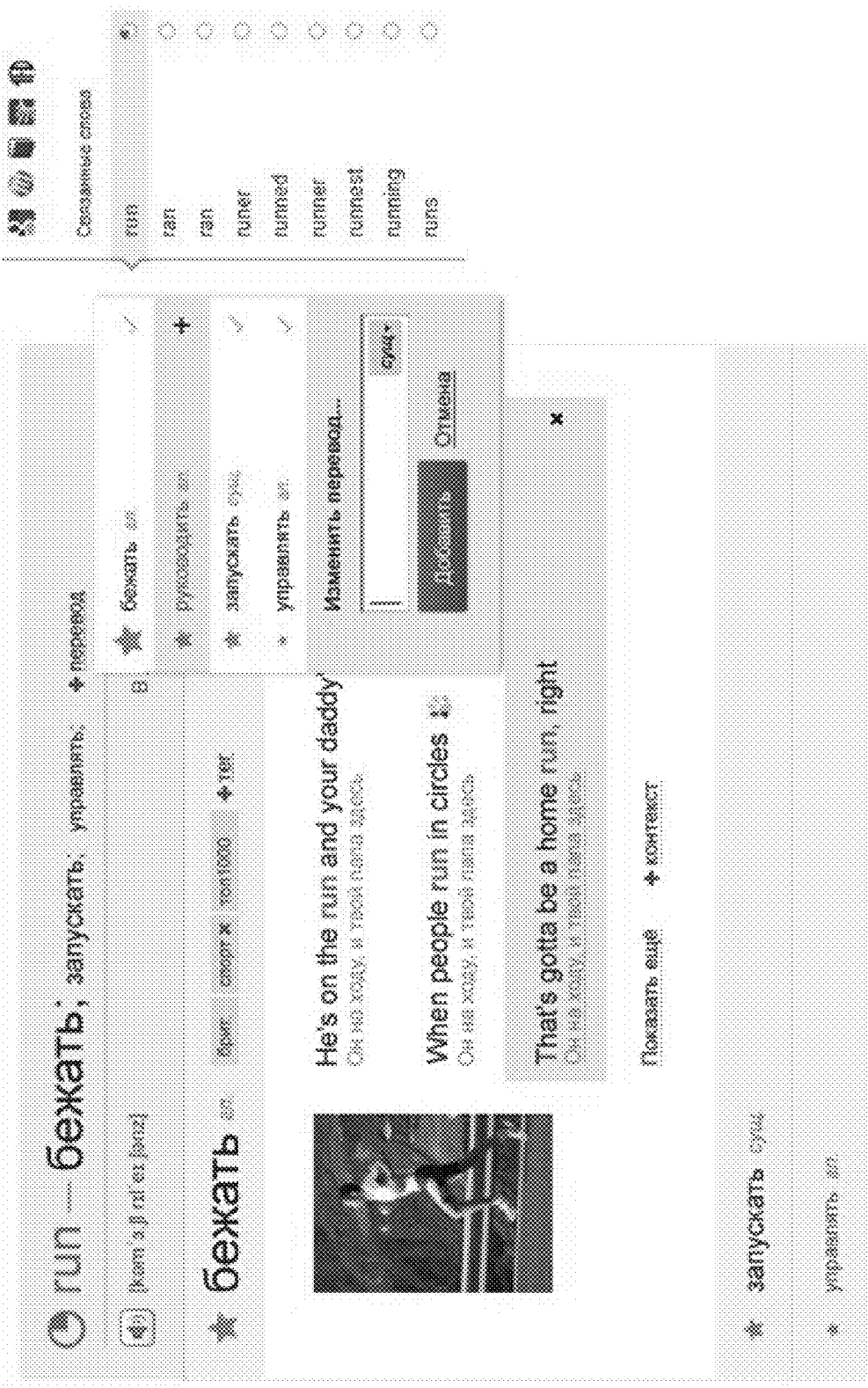
Figure 11:
Figure 12:
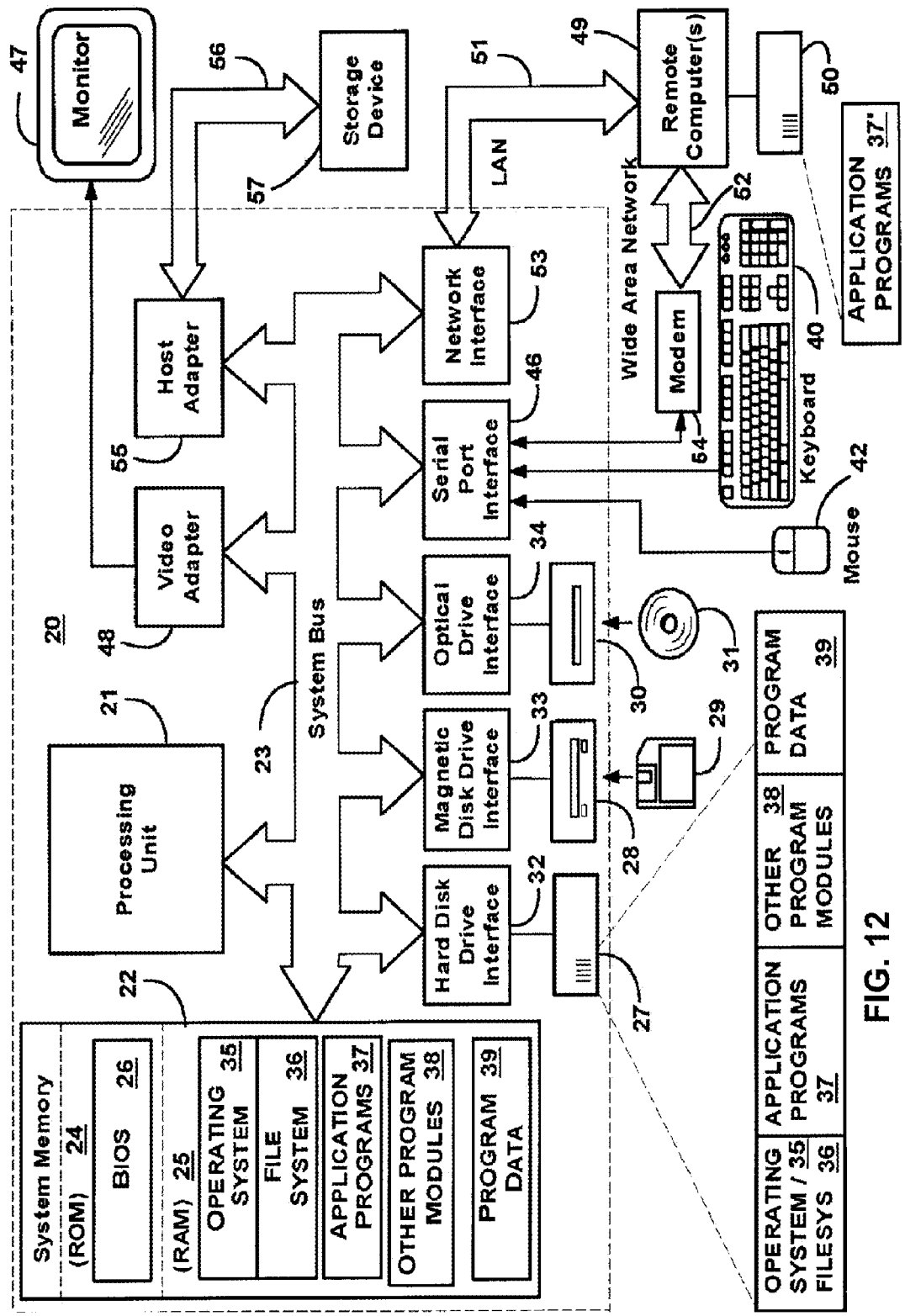

FIG. 9 is a screenshot illustrating an exemplary dictionary interface for the word "change";

FIG. 10 illustrates an exemplary screenshot showing a text box where a user can enter his translation;

FIG. 11 illustrates an exemplary dictionary interface for different translations of a word "run";

FIG. 12 illustrates an example of a computer system that can be used in the present invention.

DETAILED DESCRIPTION OF THE PREFERRED EMBODIMENTS

Reference will now be made in detail to the preferred embodiments of the present invention, examples of which are illustrated in the accompanying drawings.

The present invention is directed to a system, method and computer program product for automated creation of individual vocabulary learning dictionaries that use collected (crowd-sourced) contextual statistics and providing users with exact contextual translation of words and phrases based on collected (crowd-sourced) statistics of previous context-based translations.

Initially, each user is provided with a personal dictionary containing words and phrases that the user had previously encountered and translated. The phrases and words are automatically added to the user personal dictionary along with their contextual translations chosen by the user. A contextual dictionary allows a user to choose a correct meaning of a word and save it along with the context for future reference.

According to the exemplary embodiment, after a large number of users had created their personal dictionaries using, for example, about 50,000 texts, a frequency of different translations of the same word (or phrase) is determined. When a user works with a text, the text undergoes linguistic processing that determines a frequency of occurrence of each word in different contexts. This statistic is collected on a server. Over time, a large statistics database is accumulated. The database reflects statistical distribution (e.g., n-gram and/or second-order neighborhood) of variations of words (or phrases) in the texts.

Subsequently, a user private dictionary is created based on the statistics. This dictionary allows a user to see all possible variations of translation of a given word based on a particular context. According to the exemplary embodiment, the user personal dictionary-translator allows to view, choose and save translations of words and phrases. The dictionary-translator reflects a frequency of a certain translation of a given word (or phrase) according to a particular language and context.

The dictionary-translator is, advantageously, improved (i.e., taught) with time as more words and phrases are added. According to the exemplary embodiment, the dictionary-translator is constantly enhanced by users using "crowd-sourcing" and "people brain computing" models. The dictionary "teaching" aspect can be based on different machine-learning techniques (e.g., Naive Bayes algorithms, Support-vector machines, neural networks etc., using various sets of features, such as n-grams, part of speech, co-occurrence—PMI, Chi-square test, 2-nd order neighborhood, etc.)

In other words, the system data is developed by a large group of interested users that choose translations of words and phrases that they deem the most appropriate. Such "intelligent" data can be further used for improvement of the dictionary by means of machine-learning, natural language processing and other related algorithms and techniques.

Figure 1:
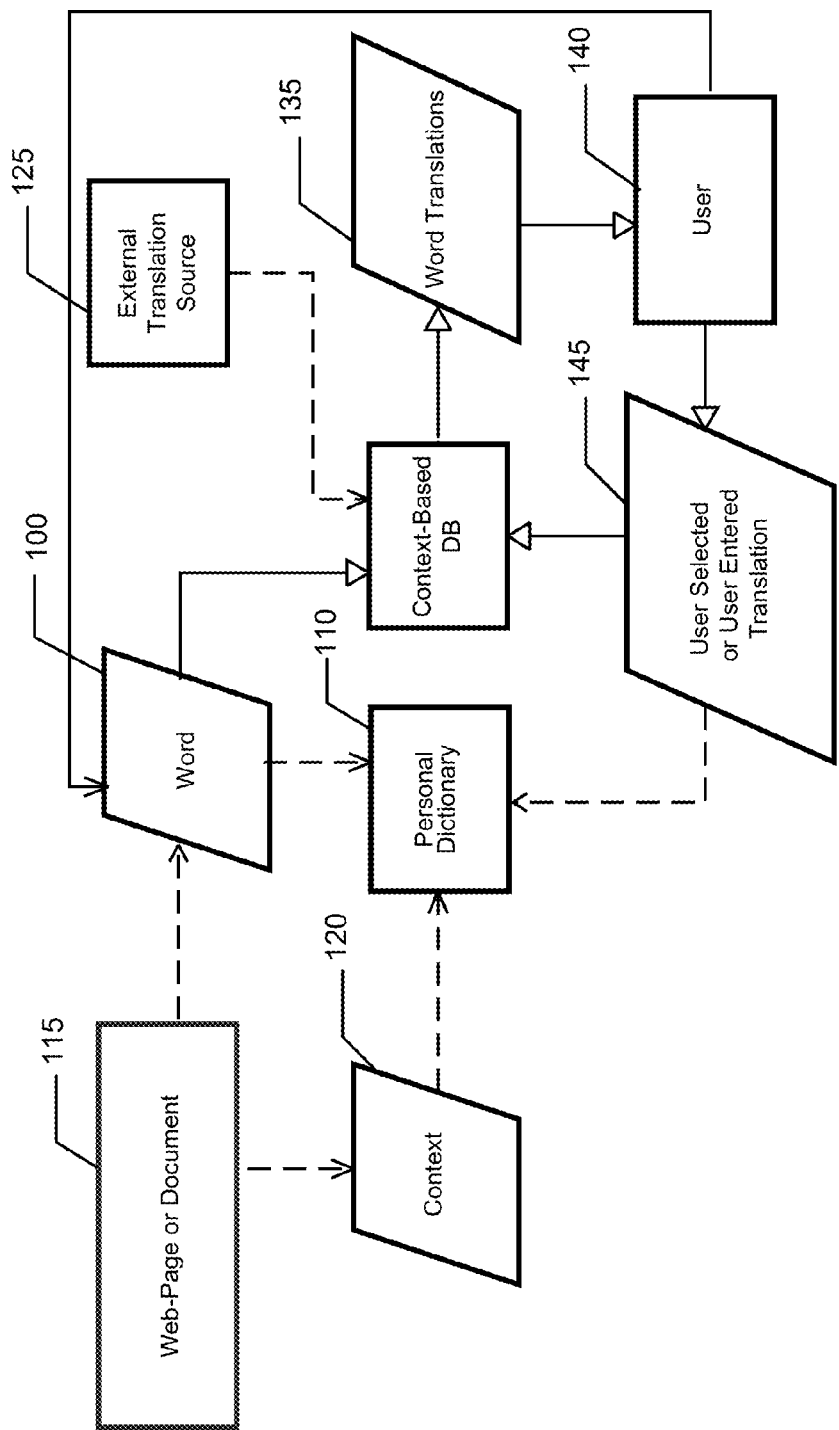
FIG. 1 illustrates general system architecture used for implementing a frequency-based dictionary-translator in accordance with the exemplary embodiment.

FIG. 1 illustrates general system architecture used for implementing a frequency-based dictionary-translator in accordance with the exemplary embodiment. The frequency-based dictionary-translator 110 is implemented as fast-access database 130 containing data related to words, translations and word metadata. A source for enhancing the frequency-based dictionary-translator 110 is words 100 encountered by users on web-pages 115, in documents, in word-processing applications, etc.

According to the exemplary embodiment, the frequency-based dictionary-translator 110 is filled by the users 140, who encounter foreign words in the web pages and click on them to choose a most frequently used context-appropriate translation. Note that the words and phrases are processed in the browser employing a proprietary application or a browser plug-in supported by a system API. The plug-in allows a user to select a word or a phrase by clicking it or dragging the mouse pointer over it. All the 'intelligent' processing is done by the system. The plug-in is just an interface. In case of mobile devices (e.g., smart-phones or tablets), dictionary-related processing is performed using a proprietary application allowing users to click on words. Note that a desktop client allows users to click on words within documents stored on the user computers.

After the user 140 clicks on the word 100 within a text of the document 115, the word 100 along with its context 100 is saved into a user personal dictionary 110. Then, translation 135 of the word 100 is acquired from a context-based dictionary database 130. If the translation is not found in the database 130, the translation is acquired from an external source (an automated translator) 125 and saved into the database 130. If the user 140 chooses to enter his own translation 145, this translation is added to his personal dictionary 110 and to the database 130 for future reference.

Figure 2:
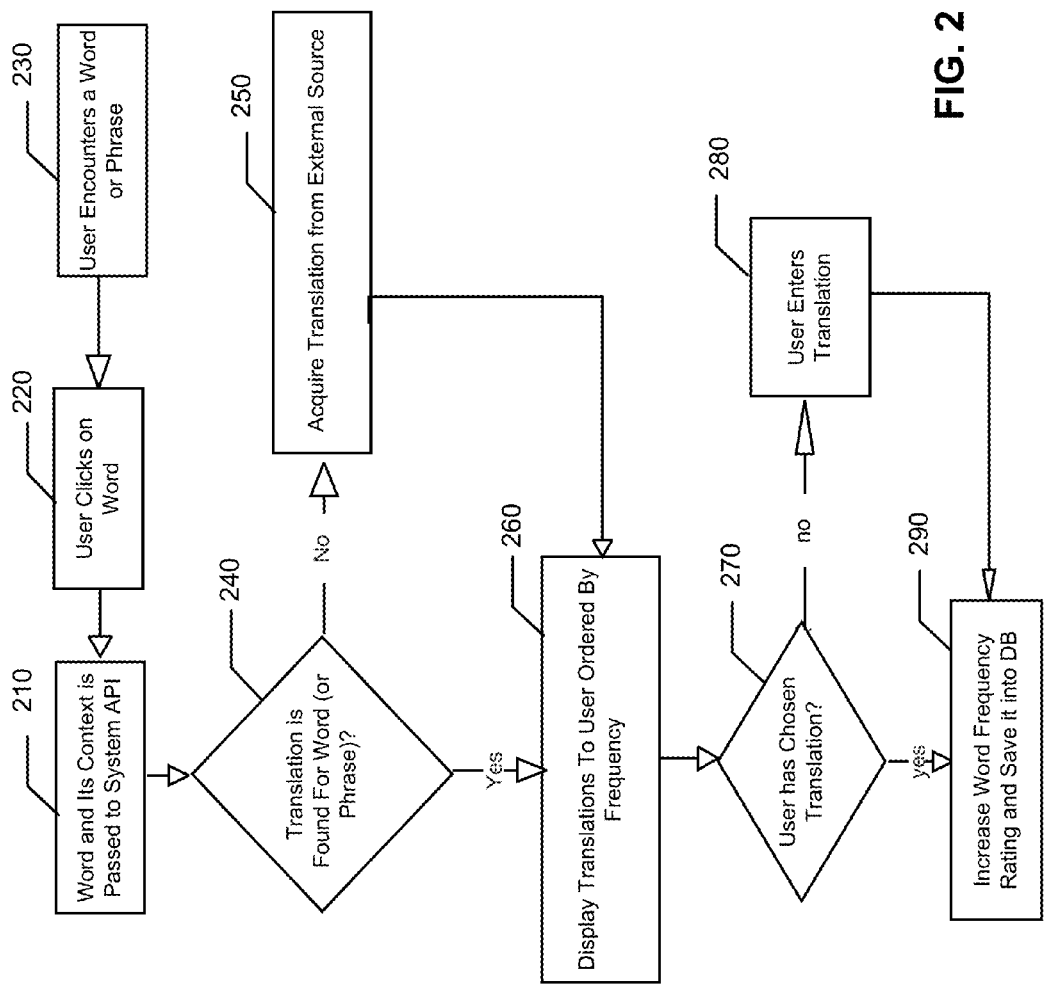
FIG. 2 illustrates a method for translated word (phrase) occurrence frequency calculation based on user selections, in accordance with the exemplary embodiment.

FIG. 2 illustrates a method for translated word (phrase) occurrence frequency calculation based on user selections, in accordance with the exemplary embodiment. A user encounters unknown foreign word in a text in step 230 and clicks on the word (or phrases) in step 220. The word (or phrase) and surrounding context is passed on to a system API in step 210. The process checks if there is a translation in a database in step 240. If the translation(s) are found in step 240, the system displays, in step 260, a menu with different translations of the word (phrase) in a requested language ordered by an occurrence frequency (i.e., popularity).

If no translations are found in step 240, the process acquires a translation from an automated translation system in step 250 and shows it to the user in step 260. If, in step 270, the user selects one or several translations, the selected translation frequency rating increases and the translation is saved in the database along with its rating, in step 290. If, in step 270, the user does not choose a translation and, instead, enters his translation in step 280, this translation is saved in the database in step 270 as well.

Note that the frequency rating of a word (or phrase) is based on a number of times this word is chosen by the users. This can be implemented as a simple incremental counter. According to the exemplary embodiment, the system always saves a context of the word (or phrase). The context is saved along with the word into the user personal dictionary and into a crowd-sourced database. When a user needs a translation, the system first checks if his personal dictionary contains this word with the same context and meta-data. If the word is not found, the system finds a translation for this word in the global database.

The context can be defined as a text surrounding a word that was selected by the user. The length of the context can be set in a number of words before and after the word (concordance model) or in linguistic units (e.g., a sentence that contains the selected word).

Figure 3:
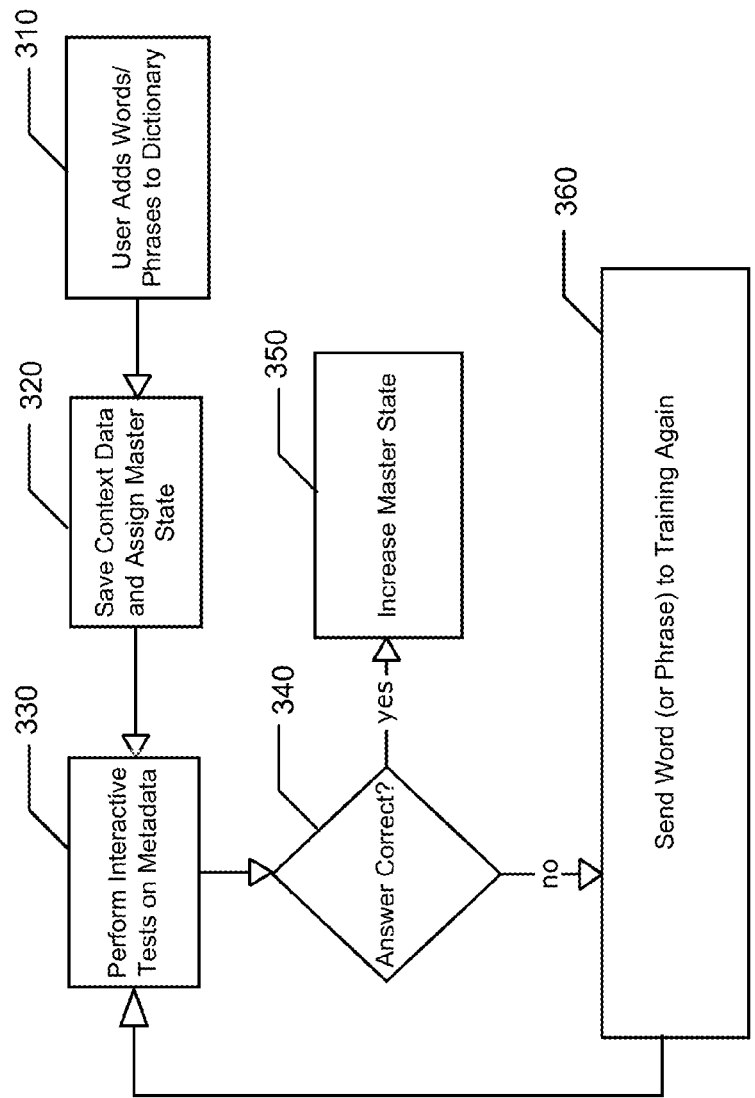
FIG. 3 illustrates a method for training of the words from a user personal dictionary, in accordance with the exemplary embodiment.

FIG. 3 illustrates a method for "training" of the words from a user personal dictionary, in accordance with the exemplary embodiment. According to the exemplary embodiment, all words in the user personal dictionary have a master state that reflects their accuracy. The master state is a numerical score that reflects a level of mastery of the word by a user. Initially it is set to zero, and it increases by 1 every time it is trained by a user. The higher the score, the better the user knows the word. The words are periodically trained (i.e., tested) for correct meanings (i.e., contextual metadata). If the word passes through training, its master status increases. The words that do not pass the tests are sent for training again after a certain time. The times, after which the words are sent for training again, can differ and depend on teaching models used.

In step 310, a user adds a word (or phrase) with a selected translation to his dictionary. The system saves the contextual information (i.e., metadata) for this word and assigns a zero master state to the word in step 320. A user is provided interactive tests to check and "train" the word metadata in step 330. Different types of tests can be used at this step depending on the user's language learning needs. Such tests can include the following:

- providing a correct translation;
- listening to the word sound and writing a word; and
- listening to the word translation and typing a correct word.

If the word's metadata fits the correct answers in step 340, the master state of the word increases in step 350. Otherwise, the word's metadata is sent for "training" (i.e., testing) again in step 360.

Figure 4:
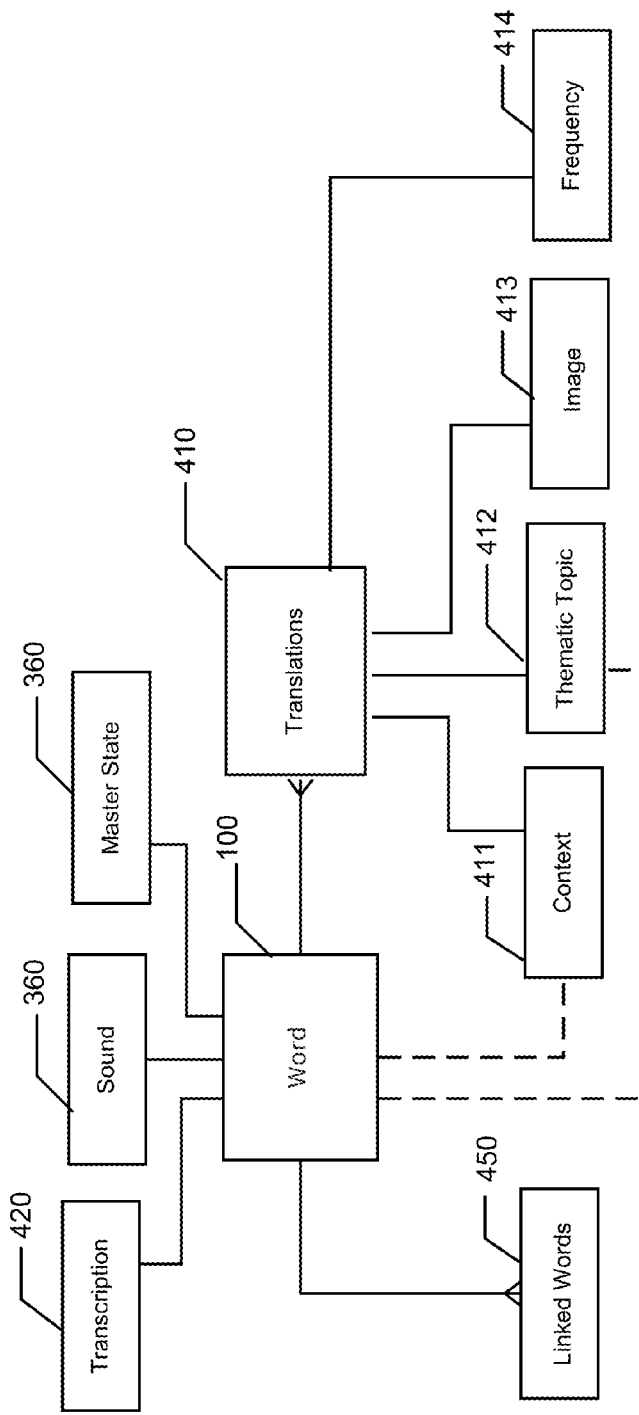
FIG. 4 illustrates generation of a word's context metadata used in the exemplary embodiment.

FIG. 4 illustrates word's metadata used in the exemplary embodiment. Each word 100 has a variety of metadata. Each word 100 has a number of translations 410. Each of the translations 410 can have a visual representation 413 (an image taken from a public web source or provided from the system database). Each translation 410 has an occurrence frequency (i.e., popularity) 414.

The translation 410 can belong to a certain thematic topic 412. Each translation 410 has a context (e.g., a sentence or certain number of surrounding words) 411 defining the meaning of the word. Additionally, the word 100 has a transcription 420 and a sound 430. Each word 100 is assigned a master status reflecting correctness of the translation determined by continuous tests (trainings). Furthermore, each word 100 has a plurality of linked words 450. The linked words 450 can be synonyms, antonyms, words with similar spelling, etc.

Note that if the word translation is not found in the system database, the system requests the translation from any available automated translation service. The system also imports the word's metadata from the external sources. Thus, the system, even at the initial point, has some word translations accompanied by the contextual metadata, discussed below.

According to the exemplary embodiment, the system can have an advantageous educational aspect. For example, a user can progress from high frequency-rated translations of words and phrases to the less known words. The user can learn words according to topics, phrase templates, synonyms, etc. In other words, the user can learn words grouped according to the certain associated metadata.

The system can provide translations of texts or web pages that are performed by different users. Some analysis of phrase templates can be also provided. The templates are result of analysis of contexts in which words are frequently used. For example, the word 'run' as verb can be used in contexts like: I run every day. She runs every morning. John runs in the park. Thus the template would be: PERSON run(s) TIME or PLACE. Such templates may help find common context in different sentences added by different users. Thus, a user can learn from other users as well. Those skilled in the art will appreciate that the proposed user dictionary and the database are dynamic—i.e., self-taught. The dictionary gets better with more use, unlike any computerized static dictionaries.

FIG. 5 illustrates an example of using the translation frequency parameter. A Russian user encounters an unknown word in a phrase "He runs the company very well." In this example, the word "runs" is the unknown word that the user clicks on in order to figure out the best fitting translation. This word has a frequency indicator of 3454. Therefore, the word has many possible translations in Russian. The first one (in front) is the most obvious one that means a physical exercise of running. This translation has a frequency rating of 500. The user selects a lower ranked translation that means "supervise" or "direct" in Russian based on the context. Then, the frequency rating of the chosen translation (i.e., "supervise") is increased. Thus, this translation shows up higher on the list next time the user encounters the same word.

Figure 6:
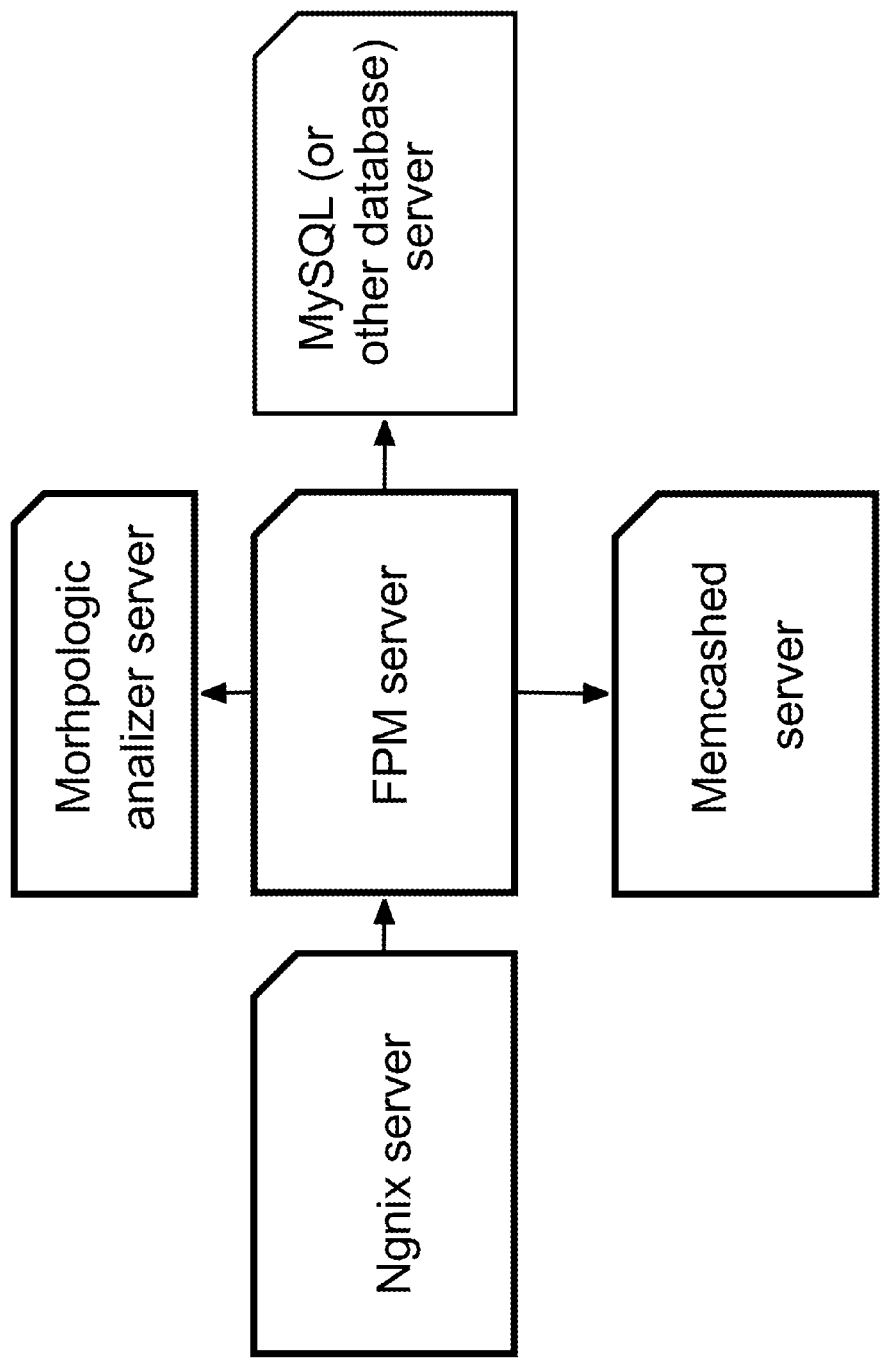
FIG. 6 illustrates server arrangement employed in exemplary embodiment.

FIG. 6 illustrates server arrangement employed in exemplary embodiment. According to the exemplary embodiment, the web interface is realized by Nginx Server 640, which sends data to a FastCGI Process Manager server—an FPM server 620. The FPM server 620 stores information in the Memcached server 650 and forwards the textual information (word and its context) to a Linguistic analyzer server 610 for linguistic processing (lemmatization, Part of speech definition, context analysis, etc). The result of such analysis is stored in MySQL (or other database) server 630 in the user's dictionary and in the global dictionary.

FIG. 7 describes a data structure and work-flow between separate elements of the exemplary implementation of the system. A personal dictionary has three tables: UserDictionary, UserTranslations and ContextDictionary.

A user adds a new word to his personal dictionary by adding a new entry to UserDictionary. The word is stored as word_value and gets an id (word_id) and is linked to the user by user_id. The word also belongs to a language (lang) and the time of its adding to the database is stored in created_at field. The combination of user_id and word_id constitute a primary key which is unique for each entry.

A user also adds a translation to the personal dictionary that is stored in the UserTranslation. The translation is stored in the field trans_value. Each translation is linked to a user by user_id, to the word by word_id and has a unique id (trans_id). To allow multiple language pairs, the language of the original word is stored in word_lang, the language of translation is stored in trans_lang. To increase the speed of the system the UserTranslations may cache the word as word_value. The combination of user_id and trans_id constitute a primary key which is unique for each entry.

The ContextDictionary stores the context each word-translation pair. Each entry in this table is linked to a user by user_id. Each context is linked to the word-translation pair which are indicated by word_id and trans_id, the actual values may be cached in word_value and trans_value to increase the speed. The text of the context is stored in the field context_text. The id of a content where the context was extracted from is stored in content_id. The combination of user_id, word_id and content_id constitute a primary key which is unique for each entry.

Simultaneously each word that is added to the personal dictionary is also added to the global dictionary in table Word. The word is stored as word_value and gets an id (word_id) and has transcription. The word also belongs to a language (lang) and the time of its adding to the database is stored in created_at field. The primary key (pk) is unique for each entry and includes its id (word_id).

The association between the word and its translation is stored in WordRank, which stores word_id and trans_id, and their rank.

WordRings is a special global table that combines words with the similar meaning in different languages. Each entry (ring) has its unique ring_id. The user_id identifies the user who first added the word to the global dictionary. Each word with the similar meaning has it word_id and lang. The primary key (pk) is unique for each entry and includes its ring_id and word_id.

Different translations are ranked based on the meta-data and the context. A user can select the most appropriate one for this particular context and thus update information about this word in his personal dictionary as well as in the global database.

FIG. 8 is a screenshot illustrating an example depicted in FIG. 5 using the word "run." FIG. 9 is a screenshot illustrating an example using the word "run" and its translation into Russian.

FIG. 10 illustrates an exemplary screenshot showing a text box where a user can enter his translation. The translation entered by the user changes the frequency of the word translation for the future references.

FIG. 11 illustrates an exemplary English-Russian dictionary interface for different translations of a word "run."

According to the exemplary embodiment, FIG. 12 illustrates an example of a computer system or a server that can be used in the present invention. An exemplary system for implementing the invention includes a general purpose computing device in the form of a computer/server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers, and storage devices 57 connected to the system bus 23 via an interface 56 and a host adapter 55.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method have been achieved.

It should also be appreciated that various modifications, adaptations, and alternative embodiments thereof may be made within the scope and spirit of the present invention. The invention is further defined by the following claims.

What is claimed is:

1. A computer-implemented method for crowd-sourced automated learning dictionary, the method comprising:
   (a) on a computer system, creating a database of word context-based translations, the translations having assigned use frequency ratings;
   (b) receiving a first word for translation;
   (c) determining a word context metadata reflecting at least one word before and at least one word after the first word;
   (d) querying the database for translations based on the word context metadata;
   (e) displaying translations to a user ordered by their respective use frequency rating, if the translations are found;
   (f) saving a first translation selected by the user in the database;
   (g) receiving a second translation entered by the user and saving it in the database along with a corresponding use frequency rating, if the second translation is not already found in the database; and
   (h) increasing the use frequency rating for the first or the second translation and saving it in the database,
   wherein the first or the second translation is displayed in a subsequent translations list according to its current use frequency rating.

2. The method of claim 1, further comprising saving the word context metadata in the database.

3. The method of claim 1, further comprising saving the first translation and a corresponding word context metadata into a user personal dictionary.

4. The method of claim 3, wherein words in the user personal dictionary are assigned a master state reflecting accuracy of the words selected by a user.

5. The method of claim 4, wherein the master state is increased upon successful testing of the words.

6. The method of claim 1, wherein the determining of the word context metadata comprises determining a number of words before and after the word.

7. The method of claim 1, wherein the determining of the word context metadata comprises determining linguistic units that contain the first word.

8. The method of claim 1, further comprising acquiring the first translation from an external source, if the first translation is not already found in the database.

9. The method of claim 1, further comprising querying the database for translations based on any of:
   a transcription;
   a sound;
   an accuracy indicator;
   a thematic topic;
   an associated image; and
   linked words.

10. The method of claim 9, further comprising training the context word metadata by any of:
    listening to a word sound and writing the word by the user; and
    listening to a word translation and typing a correct word by the user.

11. The method of claim 1, wherein the learning dictionary is self-taught.

12. The method of claim 11, wherein the learning dictionary is self-taught using any of:
    Naive Bayes algorithm;
    support-vector machines; and
    neural networks.

13. The method of claim 11, wherein the learning dictionary uses any of statistics parameters:
    n-grams;
    part of speech parameters;
    co-occurrence point-wise mutual information (PMI);
    chi-square test;
    lemmatization; and
    second order neighborhoods.

14. A system for crowd-sourced automated learning dictionary, the system comprising:
    a processor;
    a memory coupled to the processor;
    a computer program logic stored in the memory and executed on the processor, the computer program logic for implementing the steps (a)-(h) of claim 1.

* * * * *